Jan. 9, 1968 H. J. FOELL, JR., ET AL 3,362,111
DRIVING MOTOR MEANS FOR COMPACT BELT SANDER
Filed May 20, 1965 4 Sheets-Sheet 3
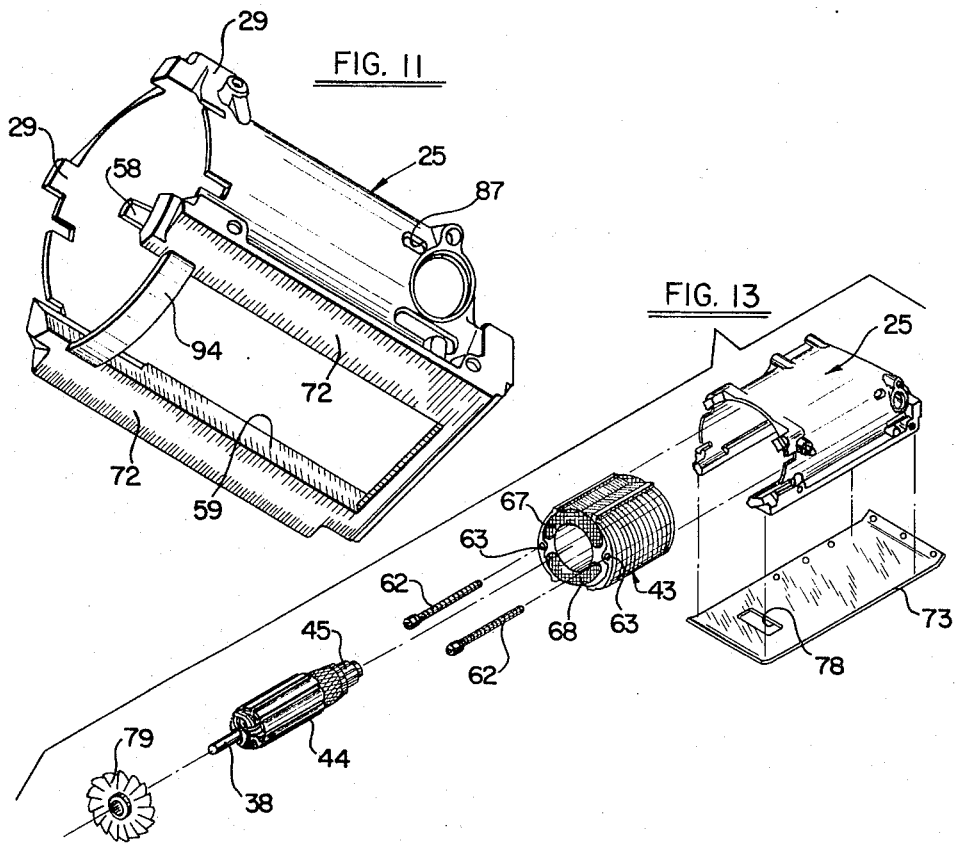
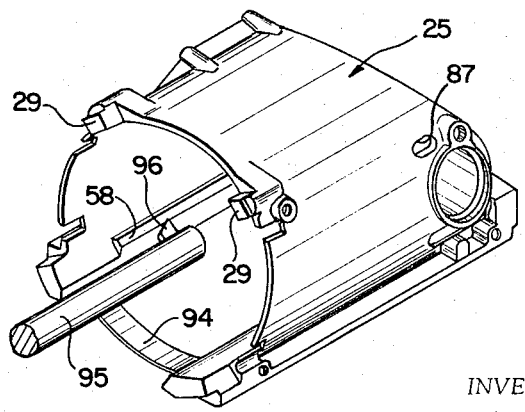
INVENTORS
HARRY J. FOELL, JR.
GEORGE R. BLEVINS
BY Leonard Bloom
ATTORNEY

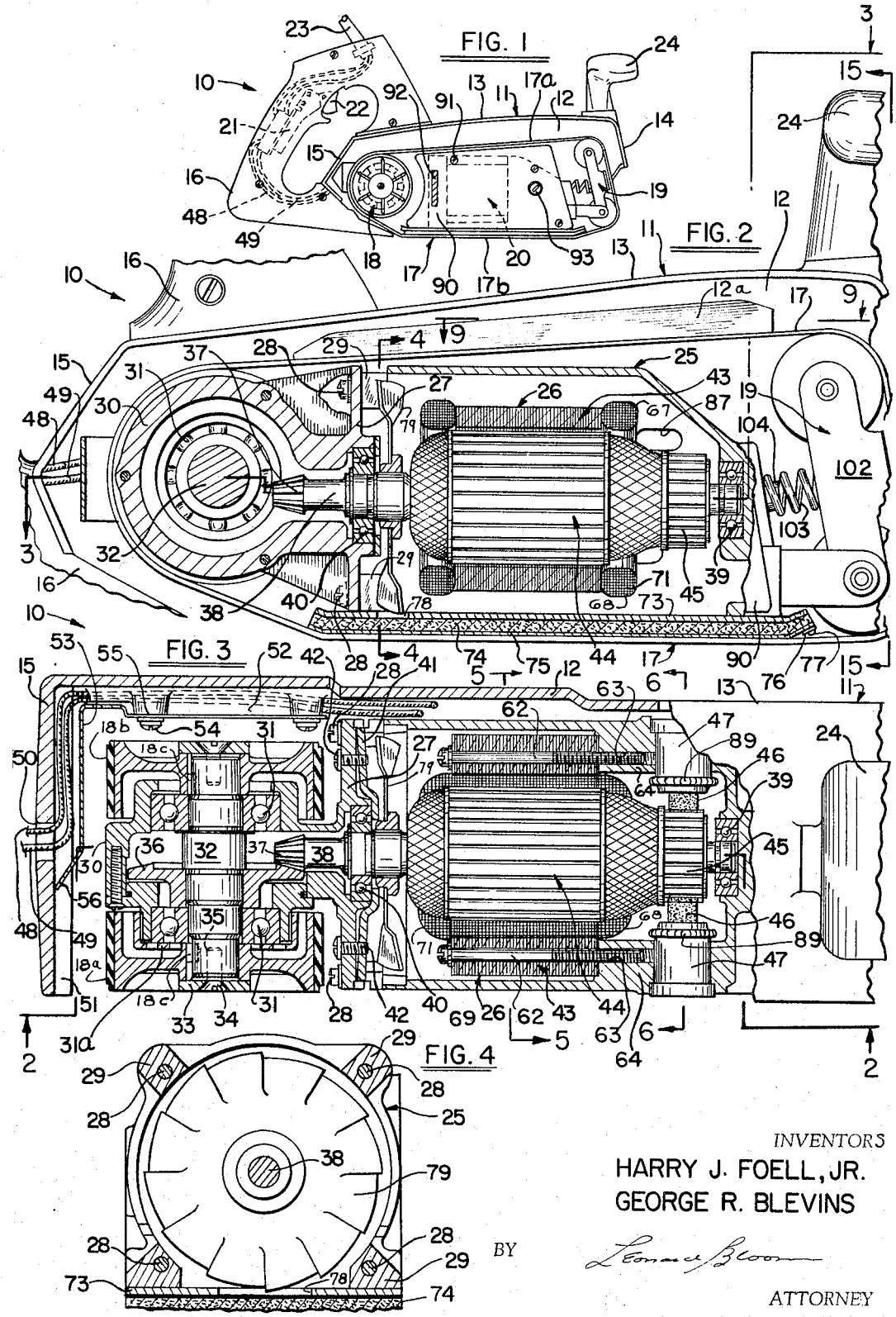

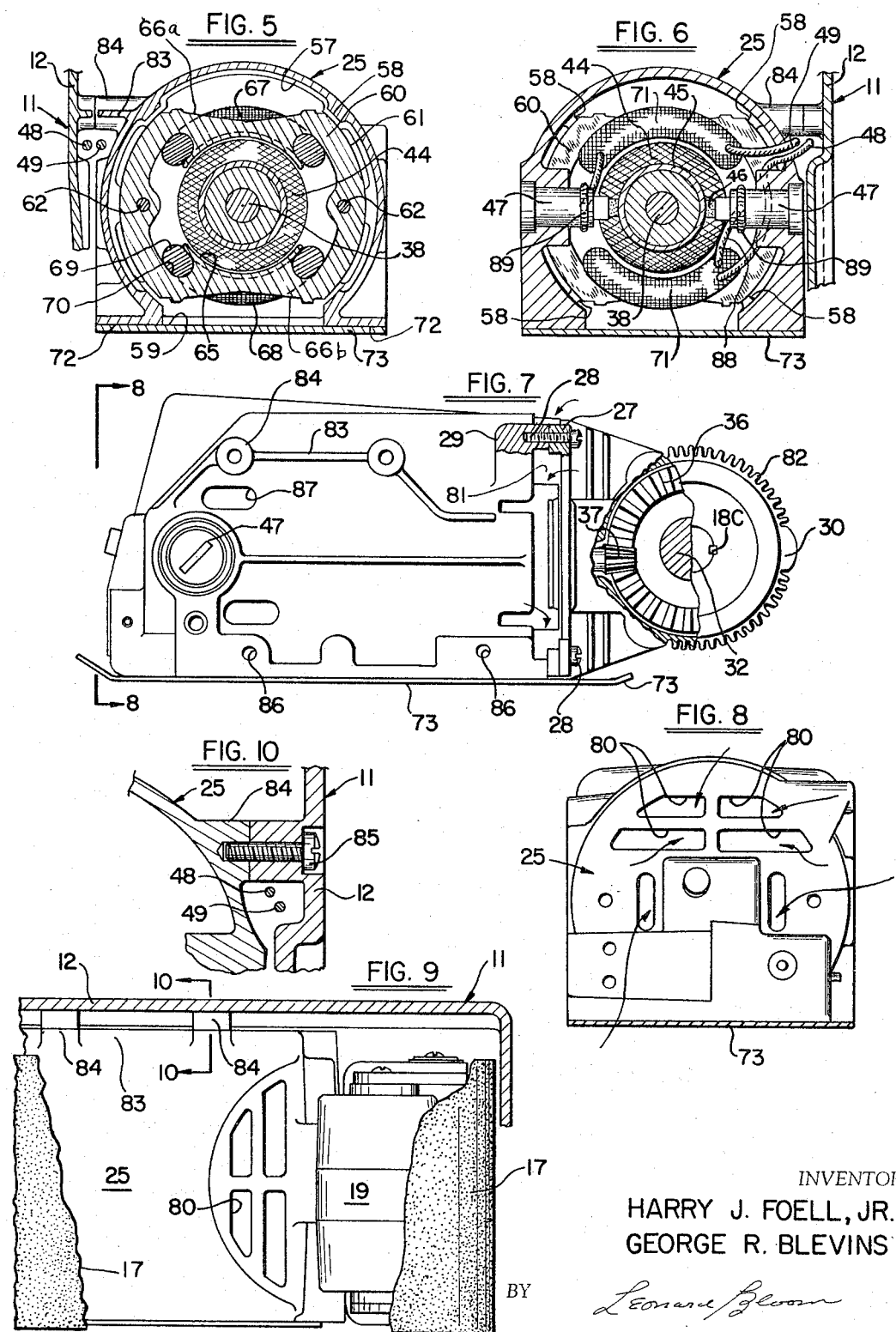

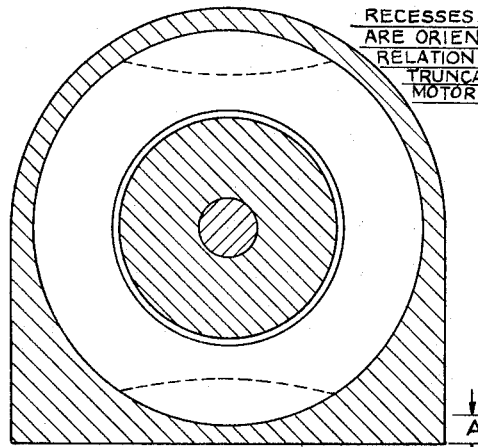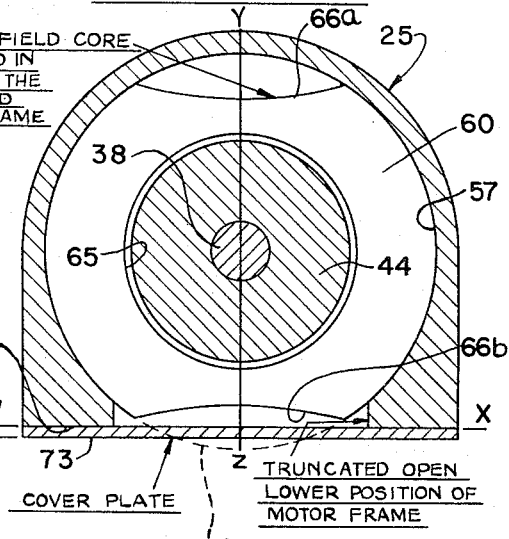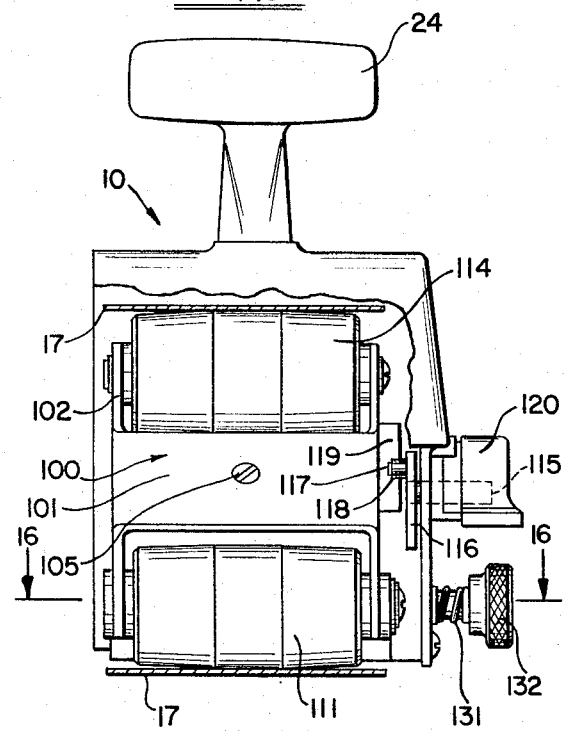

United States Patent Office

3,362,111
Patented Jan. 9, 1968

3,362,111
DRIVING MOTOR MEANS FOR COMPACT
BELT SANDER
Harry J. Foell, Jr., Lutherville, and George R. Blevins, Baltimore, Md., assignors to The Black and Decker Manufacturing Company, Towson, Md., a corporation of Maryland
Filed May 20, 1965, Ser. No. 457,439
3 Claims. (Cl. 51—170)

ABSTRACT OF THE DISCLOSURE

The device disclosed herein is a portable belt sander which comprises an elongated housing having drive and idler pulley means adjacent opposite ends thereof, and a drive motor between the pulley means and coupled to the drive pulley means. An endless belt is entrained over the pulley means and surrounds the latter as well as the motor. The idler pulley means is supported so that the distance between the idler pulley and drive pulley means, as well as the angular relation (parallel or non-parallel) therebetween can be adjusted. Handle and switch means are fixed to the housing for manipulation and control of the device.

---

The present invention relates to a driving motor means for a compact portable electric tool, and more particularly, to a compact belt sander in which the improved driving motor means is disposed directly within the endless belt.

A compact belt sander—within which the teaching of the present invention may find particular utility—generally comprises a housing formed with a side wall; and endless belt within the housing laterally of the side wall, the belt having upper and lower runs; a driving pulley means at one end of the belt; a guiding pulley means at the opposite end of the belt; a driving motor between the runs of the belt, and also, between the driving and guiding pulley means, with the motor generally being disposed along a longitudinal axis; and a suitable, gearing means interconnecting the motor with the driving pulley. Heretofore, compact belt sanders of this general description have not been commercially produced, but rather, are exemplified by the expired Swan Patent 2,280,867.

The commercial prior art, on the other hand, has invariably resorted to a structural arrangement in which the driving motor is disposed outside of the belt, and more specifically, supported upon the top wall of the belt housing. The motor is then connected to the driving pulley by a belt or by suitable gearing. This structural arrangement, comparatively speaking, is bulky and cumbersome and has a relatively high center of gravity; and accordingly, the overall tool has a relatively poor balance, and hence is somewhat difficult to guide and to control.

In improving upon the commercial prior art, and in the design of a "compact" belt sander having a general configuration as outlined above, there were several requirements to be fulfilled and attendant problems to be resolved, among which were the following: one, the performance of the compact belt sander, as measured for example by the removal rate of an abrasive belt, would have to be comparable to, and preferably superior to, the currently-available relatively-more cumbersome commercial models in which the motor was located outside of the belt; two, in order to obtain the required performance, the driving motor would have to be sufficiently powerful, which thus involved a consideration of overall motor size, that is, its length and especially its diameter; three, the overall belt sander would have to accommodate the most popular sizes of standard belts available on the market, and in particular, would have to accommodate a nominal belt size 3 x 24 inches; four, the driving and guiding pulley means, in combination with the structure of the driving motor, its frame, and the overall length thereof, would have to be carefully considered so as to accommodate the required standard-sized belt, yet at the same time, would have to be capable of facilitating good guiding, tensioning, and tracking characteristics of the belt; and five, the leading angle, which is defined as the acute angle measured between a horizontal plane and the point where the lower run of the belt engages and is received upon the driving pulley, would have to be minimized in order, first, to preserve the efficiency of the power transmission between the belt and the driving pulley, and secondly, to improve the belt guiding and tracking characteristics.

Accordingly, it is the basic object of the present invention to provide a sufficiently powerful motor for a truly "compact" belt sander, and more particularly, to provide a novel motor frame means for a standardized "universal" motor in which the diametral considerations of the motor are neutralized in so far as the overall design of the tool is concerned.

It is another object of the present invention to minimize the vertical distance from the axis of rotation of the motor to the bottom surface of the frame in which the motor is housed, and more particularly, to take advantage of the "kidney shaped" field core of the universal motor and to orient the same in relation to a truncated lower portion of the generally-cylindrical motor frame.

It is yet another object of the present invention to facilitate the design and manufacture of a compact belt sander whose performance is at least comparable to, and in a good many instances superior to, currently-available relatively-more cumbersome models in which the motor is disposed above the belt housing.

It is a further object of the present invention to provide a sufficiently powerful motor, yet by the same token, to minimize the leading angle between the belt and the driving pulley, thereby increasing the overall power transmission efficiency of the motor to the driving pulley and thence to the belt.

It is a still further object of the present invention to maintain the center of gravity of the overall belt sander as low as possible, and accordingly, to provide good balance, stability, and ease of handling capabilities.

It is a yet still further object of the present invention to accommodate a standard-sized nominal 3 x 24 inch abrasive belt within a relatively-powerful compact belt sander.

It is again another object of the present invention to shorten the overall length of the tool, and more particularly, to facilitate the combination of a unique motor frame with a "three-pulley" system in which the two idler or guiding pulleys are mounted conjointly, thereby providing all of the advantages of a "two pulley" system in conjunction with an improvement in the motor frame means between the driving and guiding pulleys.

It is again a further object of the present invention to do all of this at a cost which is consonant with the manufacture and sale of a compact belt sander at a competitive price, and yet to preserve the precision, reliability, and performance traditionally associated with an industrially-rated high quality tool.

In accordance with the broad teachings of the present invention, there is herein illustrated and described for use in conjunction with a compact belt sander of the type outlined above, an improvement in the driving motor means which is disposed within the belt; and this improvement includes a motor frame disposed within the runs of the belt, between the driving and the guiding pulley means, and laterally of the sidewall of the housing. This motor frame has a substantially-cylindrical bore and further has a lower portion truncated along a substantially-horizontal plane which intersects its cylindrical bore. A motor is provided which comprises a field and an armature rotating concentrically within the field. The armature is journaled within the motor frame and is mechanically coupled to the driving pulley means. The field includes a core having a substantially-cylindrical outer surface seated within the bore of the motor frame and suitably retained therein. The core has an upper recess and a lower recess, generally concave, and diametrically opposed to one another. The lower recess is in communication with the truncated lower portion of the motor frame, and preferably, both recesses are oriented about an axis which intersects the motor axis and which is substantially perpendicular to the truncating plane. Consequently, the motor frame may accommodate a relatively-larger diameter motor, one which is accordingly more powerful for relatively increased performance of the tool. By the same token, however, the distance from the motor axis to the lower run of the belt is minimized, thereby reducing the leading angle where the belt engages the driving pulley, and thereby substantially increasing the belt-driving efficiency. Further, the center of gravity of the belt sander is lowered for its given mass, thereby substantially improving the balance and stability of the belt sander and its handling capabilities.

In accordance with the further teachings of the present invention, the motor is of the "universal" type; and each of the field coils of the motor has a pair of respective end turns disposed axially of the field core, with the respective end turns of the lower field coil being disposed radially inwardly of the truncating plane. A cover means, preferably in the form of a plate, is secured to the truncated lower portion of the motor frame. A fan is carried by the armature for drawing cooling air in through the motor frame, and a window is formed in the cover plate for the fan to extend therein. Consequently, the diameter of the fan is increased; and since the quantity of air flow is proportional to the cube of the fan diameter, the flow of cooling air is substantially increased. This results in a cooler running motor, one which is relatively more powerful, and thus facilitates the design and manufacture of an industrially-rated compact portable electric tool.

Moreover, the teachings of the present invention are especially adaptable to those instances in which the motor frame has a bore diameter machined therein to accurate tolerances for subsequently locating the substantially-cylindrical outer surface of the field subassembly; and in this regard, the present invention involves a method concept for providing a unique motor frame suitable for a portable electric tool, such as a compact belt sander. This method concept includes the step of, first, casting a unitary substantially-cylindrical motor frame. This motor frame is a walled structure and comprises a cylindrical bore with circumferentially-spaced internal lands formed therein, an open portion truncated along a plane which intersects the cylindrical bore, a pair of substantially coplanar flat surfaces coincident with the truncating plane, one on each side of the open portion thereof, and a curved supporting strap, preferably integrally cast and connecting the co-planar flat surfaces, with the supporting strap being formed on a radius greater than that of the cylindrical bore. The method concept further includes, secondly, the step of boring the internal lands in the cylindrical bore of the motor frame casting so that the motor field core subassembly may be accurately seated therein; and finally, the method concept includes the step of facing off, that is, machining the co-planar flat surfaces, and in the process, simulaneously removing the supporting strap therefrom. The function of the supporting strap is to provide a support, first, during the casting operation, and secondly, during the boring operation, so as to prevent the casting from opening up or otherwise becoming distorted during these operations.

The structure of the motor frame means of the present invention and the manner in which the universal motor is mounted therein for minimizing the vertical distance from the axis of rotation of the motor to the lower run of the endless belt, not only enhances the vertical compactness of the overall tool, but moreover, it is compatible with a unique guiding pulley means; and the combination of the two concents, namely, the motor frame means and the guiding pulley means, has the very decided combined advantage of minimizing the overall length of the tool, insuring its longitudinal compactness and facilitating superior belt-guiding and tracking qualities. More specifically, the truncated motor frame, and its relationship to the "kidney shaped" field core subassembly of the motor, allows the available vertical space between the upper and lower runs of the belt to be utilized to its utmost extent, and in particular, to be translated in terms of maximizing the greatest diametral dimension of the motor for increased motor power, and accordingly, increased tool performance. By the same token, however, the required motor power is obtained without the expenditure of increased motor length, for example, what is usually referred to in the art as "stack length"; and this savings in motor length is important for that it combines with the individually unique structure of the guiding pulley means to considerably reduce the overall length of the tool, enhance its longitudinal compactness, and insure that a standard-sized belt may be used consonant with good tracking or alinement properties. Accordingly, the guiding pulley means comprises a pair of idler or guiding pulleys mounted conjointly upon a single bracket member for movement in relation to the belt, with the conjoint mounting means including means to simultaneously aline the respective axes of both guiding pulleys, conjointly, and in relation to the belt travel. Consequently, the pair of guiding pulleys function essentially as one guiding pulley, so that while a "three pulley" system is actually utilized, it tends to function, in effect, as a true "two pulley" system and to have all of the advantages pertaining thereto. In addition, the guilding pulleys are preferably identical to one another, with each guiding pulley having a substantially smaller diameter than the driving pulley; and thus the longitudinal space required by the overall guiding pulley means is minimized, which, in combination with the unique motor frame and its own conservation of motor length, results in a considerable reduction in overall tool length, thus facilitating the design and manufacture of a commercially-practical compact belt sander.

These and other objects of the present invention will become apparent from a reading of the following specification and drawings, in which:

FIGURE 1 is a side elevation of one embodiment of a compact belt sander in which the preferred teachings of the present invention are ideally incorporated;

FIGURE 2 is an enlarged fragmentary view of FIGURE 1, taken along the lines 2—2 of FIGURE 3, and with parts broken away and sectioned to illustrate the driving motor within the endless belt;

FIGURE 3 is a stepped section view, taken along the lines 3—3 of FIGURE 2, and showing the details of the driving pulley means and the gearing means interconnecting it with the motor;

FIGURE 4 is a transverse section, taken along the lines 4—4 of FIGURE 2, and showing the motor cooling fan and the manner in which it extends within a window formed in a cover plate, the latter being secured to the truncated lower portion of the motor frame;

FIGURE 5 is a transverse section across the driving motor, taken along the lines 5—5 of FIGURE 3, showing the manner in which the outer cylindrical surface of the field core subassembly of the universal motor is seated within the generally-cylindrical motor frame, and further showing the open lower portion of the motor frame and the manner in which it is truncated by a substantially-horizontal plane that intersects the cylindrical bore of the motor frame;

FIGURE 6 is a transverse section, taken along the lines 6—6 of FIGURE 3, showing the electrical leads and the manner in which they are connected to the series field coils, and further showing the manner in which the coils are connected to the electrical brushes that engage the commutator formed on the armature;

FIGURE 7 is an elevation of the subassembly of the motor frame and the gear case secured thereto, the motor frame being laterally reversed from its position of FIGURE 2, the pulleys being removed from the axle journaled in the gear case, and the gear case being broken away and sectioned to illustrate a preferred form of gearing means;

FIGURE 8 is an end view of the motor frame, as viewed from the lines 8—8 of FIGURE 7, and showing the air inlet openings for the motor cooling air;

FIGURE 9 is a fragmentary top plan view of the improved motor frame of the present invention, as viewed from the lines 9—9 of FIGURE 2, and with the belt being broken away;

FIGURE 10 is a detailed transverse section, taken along the lines 10—10 of FIGURE 9, enlarged over the scale of FIGURE 9, and showing the mounting of the motor frame to the side wall of the housing;

FIGURE 11 is a perspective of the "raw" casting of the motor frame, the view being drawn to a slightly reduced scale, and being taken looking into the truncated lower portion of the motor frame;

FIGURE 12 shows the method of boring the circumferentially-spaced internal lands in the cylindrical bore formed in the raw casting of the motor frame;

FIGURE 13 is an exploded perspective, drawn to a substantially reduced scale, of the motor frame, the cover plate, the field subassembly, the anchoring screws for the field subassembly, the armature, and the fan;

FIGURE 14a is a schematic presentation of the prior art teachings of the motor frame as might be applied to a compact belt sander;

FIGURE 14b is a schematic comparison with FIGURE 14a, illustrating the advantages of utilizing the teachings of the present invention;

FIGURE 15 is a front elevation of the belt sander, as viewed from the lines 15—15 of FIGURE 2, with parts broken away and sectioned to illustrate the conjoint mounting of the idler or guiding pulleys upon a single bracket; and FIGURE 16 is a transverse section, taken along the lines 16—16 of FIGURE 15, and showing a preferred tracking means that may be employed in conjunction with the teachings of the present invention.

With reference to FIGURE 1, there is illustrating a compact belt sander 10 which incorporates the preferred teachings of the present invention. It will be appreciated by those skilled in the art, however, that some of the teachings of the present invention may be applied equally as well to other types of portable electric tools and devices, and that the particular belt sander 10 represents only a preferred embodiment thereof. With this in mind, the compact belt sander 10 generally comprises a housing 11 formed with a side wall 12, a top wall 13, a front end wall 14, and a rear end wall 15; an end handle 16 secured rearwardly of the housing; an endless belt 17 within the housing, the belt having an upper "run" 17a and a lower "run" 17b and the belt being suitably formed for abrading, polishing, or burnishing operations, and the like; a driving pulley means 18 at one end of the belt; a guiding pulley means 19 at the other end of the belt; and the improved driving motor means of the present invention, the latter being denoted generally as at 20. In addition, the compact belt sander 10 further comprises a switch 21 in the end handle; a trigger 22 to actuate the switch to energize the unit from an electrical line cord 23; and a front handle 24 to assist in the manual guidance and control of the unit.

With reference to FIGURES 2 and 3, the driving motor means 20 comprises a motor frame 25 and a motor 26 mounted therein, preferably along a generally longitudinal axis. The motor frame 25 is disposed between the driving pulley means 18 and guiding pulley means 19, between the upper and lower runs of the belt 17, and laterally of the side wall 12 of the housing. The motor frame 25 is open at one end, see FIGURE 7 as well, and a wall 27 is secured thereto by screws 28 received in respective axially-extending tapped bosses 29 formed in the motor frame 25. The wall 27 is formed integrally with a gear case 30 disposed rearwardly of the motor frame 25. The gear case 30 has spaced bearings 31 (one of which is retained by means of a collar 31a) for journaling an axle 32. The ends of the axle 32 extend beyond the gear case 30, and a pair of driving pulleys 18a and 18b (of the driving pulley means 18) are preferably keyed to the axle 32 by means of keys 18c and are retained thereto by means of respective washers 33 and screws 34, the latter being received in respective tapped recesses 35 formed in the ends of the axle 32. A gear 36 is pressed onto (or suitably keyed) to the axle 32 and engages a suitable pinion 37 formed on an armature shaft 38. The armature shaft 38 is journaled in bearings 39 and 40 mounted respectively in the motor frame 25 and wall 37 of the gear case 30, with the bearing 40 being retained in the wall 27 by means of a strap 41 secured by screws 42. The motor 26 comprises a field subassembly 43 and an armature 44 rotating concentrically therein. The armature 44 is formed on the shaft 38 and carries a commutator 45 which engages brushes 46. The brushes 46 are retained within respective brush holders 47 mounted transversely in the motor frame 25; moreover, the brushes 46 are connected to the field subassembly 43 in a manner hereinafter described, with the field subassembly 43 in turn being connected to a pair of electrical leads 48 and 49. These electrical leads 48 and 49 are disposed within the end handle 16 of the tool, see FIGURE 1 again, and are connected through the switch 21 to the line cord 23. The leads 48 and 49 are received through an opening 50 formed in the end wall 15, see FIGURE 3, and thence are received within a dwell 51 formed in the end wall 15 and a communicating dwell 52 formed in the side wall 12. The leads 48 and 49 run along the side wall 12 longitudinally of the tool, and the leads are confined within their respective communicating dwells 51, 52 by means of a cover member 53. The cover member 53 is secured by means of screws 54 received in bosses 55 in the side wall 12, and the cover member 53 is preferably formed from a thin resilient sheet metal and has a right-angularly bent portion formed with an inclined tip 56 overlying the opening 50 in the end wall 15 where the leads 48 and 49 emerge from the end handle 16. The continuations of the leads 48 and 49 (beyond the cover member 53) are confined between the dwell 52 in the side wall 12 and a cooperating rib formation formed on the motor frame 25. In such a manner, the electrical leads 48 and 49 are confined within the housing and are prevented from coming into contact with the belt 17. The location of the electrical leads in the housing, and confining the leads by means of the communicating dwells and cooperating cover member, form no part of the present invention, but are described more particularly in the co-pending Blevins et al. application Ser. No. 453,101, filed May 4, 1965, entitled "Electrical Connection Means for Compact Belt Sander," now Patent No. 3,331,165 and assigned to the assignee of the present invention. As shown in FIGURE 2, moreover, a belt guard 12a is secured to the side wall 12 in accordance with conventional practice.

With reference to FIGURES 4, 5, 6, and 7, and also with reference to FIGURE 13, the motor frame 25 of the present invention comprises a generally-cylindrical walled structural member provided with a cylindrical opening 57, which for the purposes of the present disclosure, may be considered as a cylindrical bore 57; and the bore 57 preferably has a plurality of circumferentially-spaced internal lands 58 formed therein. Moreover, and of special significance, the lower portion of the motor frame 25 is open and is truncated, as at 59, with the truncating plane intersecting the projected continuation of the cylindrical bore 57. In this particular embodiment of the present invention, the truncating plane is substantially horizontal, and the motor frame 25 generally has an inverted "U-shaped" cross-section. The motor 26, on the other hand, is of the "universal" series-field type; and its field subassembly 43 includes a laminated field core 60 which has an outer cylindrical surface 61 adapted to be seated within the motor frame 25 and accurately located upon the internal lands 58. The core 60 is secured within the motor frame 25 by means of screws 62; the screws 62, see FIGURE 13, pass through respective bores 63 formed in the core 60 and are received in respective tapped bosses 64, see FIGURE 3 again, which are formed in the rear portion of the motor frame 25. The field core 60, in turn, has its own generally-cylindrical bore 65 for receiving the rotating armature 44 in concentric relationship therewith. Moreover, and of further significance, the field core 60 is "kindey-shaped" and is provided with a pair of diametrically-opposed substantially-concave recesses 66a and 66b, with the lower recess 66b being in communication with the open truncated portion 59 of the motor frame 25.

The deliberate truncation of the generally-cylindrical motor frame 25—and its orientation in relation to the "kidney-shaped" field core 60—is an important teaching of the present invention and is decidedly advantageous in minimizing the vertical height of the driving motor means wthin the upper and lower runs of the belt 17, as hereinafter described in greater detail.

The field subassembly 43, moreover, further includes a pair of field coils comprising an upper field coil 67 and a lower field coil 68. Each field coil 67 and 68 has respective side portions 69 which are received within respective substantially - parallel longitudinally - disposed winding slots 70, see FIGURES 5 and 13, formed in the laminated field core 60. Moreover, the field coils 67 and 68 have respective pairs of end turns 71 on each axial end of the core 60. These end turns 71 are substantially arcuate (when viewed in end elevation as in FIGURE 6) with the respective end turns 71 of the lower coil 68 being disposed above the open truncated portion 59 of the motor frame 25, that is, radially inwardly of the truncating plane. The end turns 71 are in effect folded or flared radially, see FIGURES 2 and 5, so that the end turns 71 will clear, not only the lower truncated portion 59, but also, the rotating armature 44. In other motor designs, however, the end turns 71 may be in closer proximity to the axis of rotation of the motor, depending upon the overall motor construction, in which case the degree of truncation of the motor frame 25 may be increased. The motor frame 25 further has a pair of lower co-planar flat surfaces 72 formed substantially coincident with the truncating plane; and a cover plate 73 is secured to the flat surfaces 72 for enclosing the motor 26 within the motor frame 25. A cork pad 74 and a thin resilient sheet metal plate 75 are secured at one end of the cover plate 73 by means of a retaining strip 76 and screws 77, see FIGURE 2 again; the cork pad 74 and sheet 75 are thus cantilever supported from the cover plate 73, and in combination with the cover plate 73, form a platen support for the belt 17 in a manner well known in the art.

Moreover, the cover plate 73 has a window 78 formed therein; and a fan 79, which is carried by the armature shaft 83 as shown in FIGURE 2, extends within the window 78 as shown more clearly in FIGURE 4. The motor frame 25 is provided with a plurality of air inlet openings 80 formed in its rear portion, see FIGURES 8 and 9, and the fan 79 is adapted to draw cooling air in through the inlet openings 80 and to discharge the same radially through the exit openings 81. These exit openings 81, see FIGURE 7, are formed by the open spaces between the wall 27 and the motor frame 25, circumferentially of the tapped bosses 29. The cooling air passes through the motor 26, and also, around the outer cylindrical surface 61 of the field core 60, circumferentially of the lands 58. This enhances the cooling of the entire motor. The cooling air does not pass through the window 78, which is covered by the pad 74, the only purpose of the window 78 in the cover plate 73 is to increase the diameter of the fan 79 and hence increase the flow of cooling air for the motor; as is recited in Marks "Mechanical Engineers Handbook," Fifth Edition, page 1911, the flow of cooling air will vary proportionally with the cube of the fan diameter. In this particular embodiment, the relatively-more powerful motor requires a considerable flow of cooling air, and the addition of the window 78 in the cover plate 73, with the consequent increase in the fan diameter and air flow, was fairly desirable in achieving good air flow and motor cooling capabilities consonant with a heavy-duty industrially-rated portable electric tool. The gear case 30, moreover, see FIGURE 7 again, is provided with a plurality of external cooling fins 82 to facilitate heat dissipation.

With reference to FIGURES 7 and 10, the motor frame 25 has a rib formation 83 with axially-spaced tapped bosses 84, and the motor frame 25 is secured to the side wall 12 of the housing by means of a plurality of screws 85 that are received within the tapped bosses 84, and also, with additional tapped recesses 86 formed in the lower portion of the motor frame 25. Moreover, the motor frame 25 has an opening 87 to receive the electrical leads 48 and 49, with these leads being confined in the dwell 52 formed in part by the rib formation 83 on the motor frame 25. The electrical leads 48 and 49, as shown in FIGURE 6, are connected directly to the field coils 67 and 68, with the coils in turn being connected to the brushes 46 by means of leads 88 and garter-type springs 89. A side plate 90, see FIGURE 1 again, is secured to the exposed side of the motor frame 25 by screws 91, and the side plate 90 has a slotted opening 92 for the cooling air, and also, an access opening 93 for one of the brushes 46.

In the manufacture of the motor frame 25, the sequence is as follows: a unitary substantially-cylindrical motor frame is cast, preferably of aluminum or a suitable metal; and as previously noted, this motor frame is provided with a cylindrical bore 57 with internal lands 58, an open truncated portion 59 formed along a plane which intersects the cylindrical bore, and a pair of substantially co-planar flat surfaces 72 coincident with the truncating plane, one on each side of the open portion 59. Further, the raw casting of the motor frame, see FIGURE 11, is provided with a curved supporting strap 94, which integrally connects the co-planar flat surfaces 72 and is formed on a radius greater than that of the cylindrical bore 57 in the motor frame. The internal lands 58 in the bore 57 are first accurately machined to close tolerances by means of a rotating boring bar 95 (or the like) having one or more cutting elements 96 as shown in FIGURE 12. In this boring operation for the machined bore in the motor frame 25, the cutting element 96 will clear the supporting strap 94. After the boring operation, the co-planar flat surfaces 72 are "faced off" in a milling machine, and simultaneously, the supporting strap 94 is removed. The supporting strap 94 supports the motor frame 25 during its casting operation, and also, during its boring operation; and thus prevents the substantially U-shaped cross-section of the motor frame 25 from opening up or otherwise becoming distorted during these operations.

Subsequently, and as previously noted, the field subassembly 43, and more particularly, the outer cylindrical surface 61 of its field core 60, may be accurately seated on the machined internal lands 58 in the cylindrical bore 57 of the motor frame 25, with the diametrically-opposed concave recesses 66a and 66b being positioned in relation to the open truncated portion 59 of the motor frame 25, and with one of the recesses (66b in this instance) being in communication therewith.

The purpose and function of deliberately truncating the motor frame 25 and of so locating the field subassembly 43, may be understood more clearly with reference to FIGURES 14a and 14b. FIGURE 14a illustrates, somewhat schematically, the teachings of the prior art, wherein the motor frame is completely cylindrical, as in the above-noted Swan Patent, and not truncated as in the present improvement. Further, FIGURE 14a illustrates the result of incorporating a "kidney-shaped" field subassembly of a conventional universal motor with the teachings of the Swan patent. There is no deliberate truncation of the motor frame, and also, no definite showing of the manner in which the field should be oriented, circumferentially, within the motor frame. The comparative improvement of the present invention, however, is shown in FIGURE 14b. Here, the generally-cylindrical motor frame 25 is open at the bottom and is truncated by a plane W–X which intersects the bore 57, the continuation of the bore being shown by the broken lines denoted as at 57'. The diametrically-opposed concave recesses 66a and 66b in the "kidney-shaped" field lamination are oriented about an axis Y–Z which intersects the motor axis and which is substantially perpendicular to the truncating plane W–X. Consequently, the motor frame has a somewhat U-shaped inverted cross-section, with its open lower portion being enclosed by the cover plate 73. In such a manner, the distance from the motor axis to the bottom of the cover plate 73 is minimized, with the relative distance that is conserved being denoted as at A. This allows a relatively-more powerful motor to be fitted between the runs of the belt, and between the driving and guiding pulleys, thus facilitating the manufacture of a commercially-practical compact belt sander with no sacrifice in its performance as compared to the relatively-more cumbersome commercial units in which the motor is mounted on top of the belt housing.

Moreover, the configuration of the driving motor means 20 is used to advantage in conjunction with the guiding pulley means 19, the latter being shown in FIGURES 15 and 16. Here, a lower yoke bracket 97 has one end of its base portion 98 secured to the motor frame 25 by means of a screw 99. The legs of the lower yoke bracket 97 straddle a second bracket 100. This second bracket 100 has a base portion 101 and a pair of integral side flanges 102. The base portion 101 is constantly urged away from the motor frame 25 by means of a compression spring 103. The spring 103 is seated between a stud 104 on the motor frame 25, see FIGURE 2, and a screw 105 carried by the base 101 of the second bracket 100. The respective lower portions of the side flanges 102 of the second bracket 100 are straddled by the yoke bracket 97 and are pivoted thereto along an axle 106 shown in FIGURE 16. The axle 106 is retained in the yoke bracket 97 by means of a retaining ring 107 at one end of the axle 106 and a headed screw 108 received in a tapped recess 109 formed in the other end of the axle 106. The axle 106 has respective roller bearings 110 for journaling a "crowned" pulley 111, and respective molded plastic bushings 112 are carried in the bore 113 of the pulley 111 adjacent to the roller bearings 110. The pulley 111 is substantially identical to a pulley 114 at the top of the second bracket 100; and the combination of the two pulleys 111 and 114, with the brackets 97 and 100, comprise the guiding pulley means 19. In such a manner, both guiding or idler pulleys 111 and 114 are mounted for conjoint movement in relation to the belt, and in effect, act as one large overall guiding pulley. However, the guiding pulleys 111 and 114 have a relatively small diameter in comparison to what would otherwise be required if one large guiding pulley were employed, and hence the guiding pulley means 19 requires less longitudinal space; and this, in combination with the improved structure and configuration of the motor frame 25, facilitates the manufacture of a truly-compact relatively-powerful belt sander which readily accommodates the use of a standard-sized nominal 3 x 24 inch abrasive belt. The detailed structure of the guiding pulley means 19 forms no part of the present invention, but is described more particularly in the copending Blevins application Ser. No. 447,317, filed April 12, 1965, entitled "Guiding Pulley Means for Belt Sander," and assigned to the assignee of the present invention.

The function of the spring 103 is to properly tension the belt, and means are provided to retract the bracket 100 away from the belt against the tension of the spring 103. This retraction means includes a shaft 115 journaled in the side wall 12 of the housing. The shaft 115 has an inward portion which is radially enlarged, as at 116, and carries a crank pin 117 with a roller 118. The roller 118 is in engagement with a right-angularly bent integrally-formed tab 119 on one of the side flanges 102 of the second bracket 100. The shaft 115 carries an external knob or lever 120, and rotation of the lever 120 causes the roller 118 to engage the tab 119 and hence to retract the second bracket 100 away from the belt 17. This retraction of the bracket 100 is substantially a pivotal movement about the axis of the lower pulley 111 and facilitates the removal of the belt 17 from the tool.

Moreover, the conjoint mounting of the guiding pulleys 111 and 114 facilitates a conjoint or simultaneous alinement of their respective axes with respect to the belt travel. As shown in FIGURE 16, the base 98 of the lower yoke bracket 97 is pivoted to the motor frame 25 by means of a screw 99, while the remaining portion of the face of the motor frame 25 is inclined, as at 121, preferably in an annular direction which diverges away from the screw 99. This, in combination with the inherent resiliency of the lower yoke bracket 97 (provided by reason of its material and the manner in which it is formed) causes the yoke bracket 97 to tend to "spring back" against the inclined face 121 of the motor frame 25, that is, the yoke bracket 97 is constantly urged in a direction about a pivot axis which substantially encompasses the screw 99. Means are then provided to selectively move the bracket 97 in the opposite direction, away from the inclined face 121, about its pivot axis, and against its inherent resiliency. This means comprises a wedge 122 mounted for limited longitudinal movement within a bore 123 formed in the motor frame 25. The wedge 122 has a tip formation 124 which is seated within the base 98 of the yoke bracket 97. The movement of the wedge 122 is limited by means of a pin 125 received in a slot 126 formed in the wedge 122. The inner portion of the wedge 122 has a chamfered face 127 which engages a conically-shaped pilot portion 128 of an adjusting screw 129. The screw 129 is received within a tapped recess 130 in the motor frame 25 and is tensioned by means of a spring 131. A knurled adjusting knob 132 is carried on the end of the screw 129. When the knob 132 is rotated, the adjusting screw 129 is advanced within the motor frame 25, and this causes a wedging action against the wedge 122 which, in turn, urges the yoke bracket 97 away from the motor frame 25 and about its pivot axis. In such a manner, the axes of both guiding pulleys 111 and 114 may be accurately alined, simultaneously, with respect to the belt travel. The details of this tracking mechanism form no part of the present invention, but are described more particularly in the co-pending McCarty et al. application Ser. No. 449,983, filed April 22, 1965, entitled, "Tracking Means for Belt Sander," and assigned to the assignee of the present invention.

Obviously, many modifications may be made without departing from the basic spirit of the present invention; and accordingly, within the scope of the appended claims, the invention may be practiced other than has been specifically described herein.

We claim:

1. In a compact belt sander comprising a housing, an endless belt within the housing and having upper and lower runs, driving pulley means and guiding pulley means at opposite ends of the belt, and a driving motor within the belt and between the driving and guiding pulley means; the improvement wherein said housing is elongated, said driving and guiding pulley means being supported adjacent opposite ends of said housing and extending generally transversely thereof, said belt upper and lower runs extending generally longitudinally of said housing, a motor frame within said belt and between said driving and guiding pulley means, said motor frame having a substantially cylindrical bore extending generally longitudinally of said elongated housing, and a lower portion which is truncated along a substantially horizontal plane intersecting said cylindrical bore, said motor comprising a field and an armature rotating concentrically within said field, means coupling said armature to said driving pulley means, said armature being journaled within and extending longitudinally of said motor frame, a motor cooling fan rotatable with said armature, said field including a core having a substantially cylindrical outer surface seated within said motor frame bore, said core having diametrically opposed recesses one of which is aligned generally with said truncated lower frame portion, a cover for said truncated lower frame portion, said cover having a window formed therein receiving said fan.

2. In the construction defined in claim 1, the further improvement wherein said field includes upper and lower field coils connected in series with each other and with said armature, each of said field coils having a pair of respective end turns disposed axially of said core, the end turns of said lower field coil being disposed above said truncating plane.

3. In the construction defined in claim 1, the further improvement wherein said motor armature includes an armature shaft, said driving pulley means including a pulley shaft having pulley means secured thereon for rotation therewith, said coupling means including intermeshing gears carried by said armature shaft and pulley shaft.

References Cited

UNITED STATES PATENTS

| | | | |
|---|---|---|---|
| 1,674,876 | 6/1928 | Thompson | 310—258 |
| 2,289,481 | 7/1942 | Burleigh | 51—170 |
| 2,576,745 | 11/1951 | Auten | 51—170 |
| 3,093,170 | 6/1963 | Thayer. | |
| 3,094,819 | 6/1963 | Murschel | 51—170 |

FOREIGN PATENTS

| | | |
|---|---|---|
| 1,110,740 | 7/1961 | Germany. |

HAROLD D. WHITEHEAD, *Primary Examiner.*